July 14, 1942.   H. W. FAULSTICH ET AL   2,289,418
SWITCH AND CIRCUITS CONTROLLED THEREBY
Filed Dec. 13, 1940   4 Sheets-Sheet 1
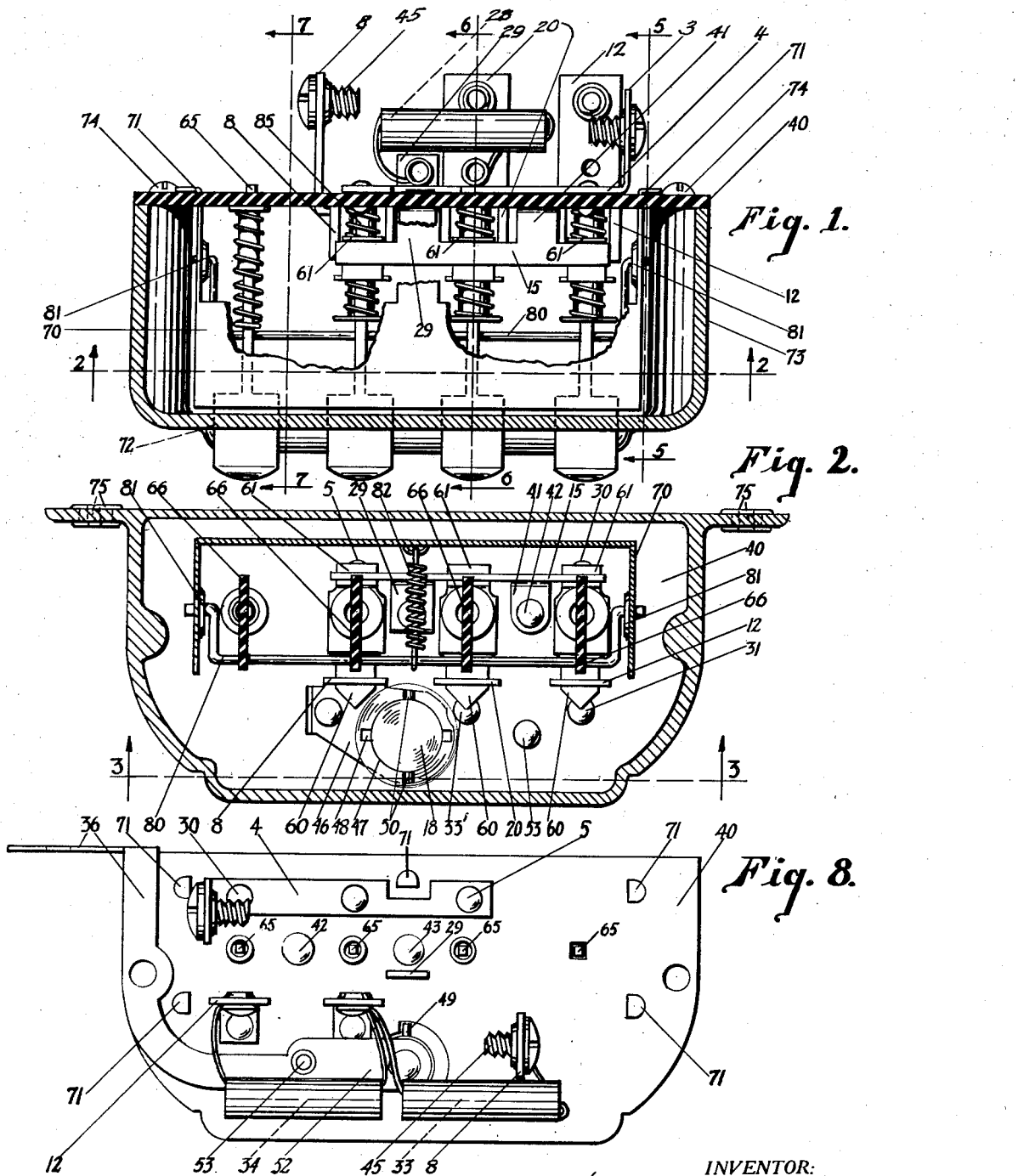
INVENTOR:
Henry W. Faulstich
BY Walter C. Sueneburg
Harold Olsen
ATTORNEY

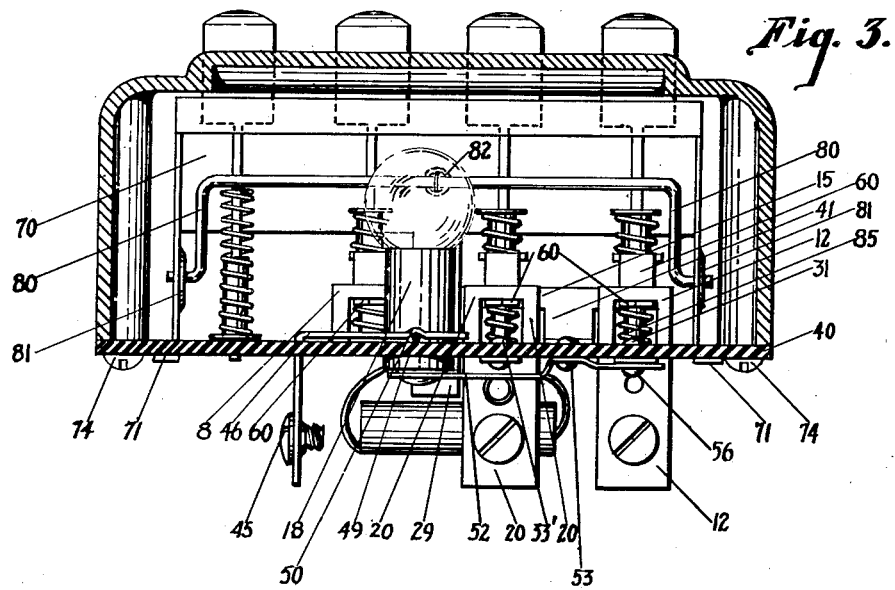

July 14, 1942.   H. W. FAULSTICH ET AL   2,289,418
SWITCH AND CIRCUITS CONTROLLED THEREBY
Filed Dec. 13, 1940   4 Sheets-Sheet 3

INVENTOR:
Henry W. Faulstich
BY Walter C. Sueneburg
Harold Olsen
ATTORNEY

Patented July 14, 1942

2,289,418

UNITED STATES PATENT OFFICE 2,289,418

SWITCH, AND CIRCUITS CONTROLLED THEREBY

Henry W. Faulstich, Chicago, and Walter C. Lueneburg, Evanston, Ill., assignors to Tropic-Aire, Incorporated, Chicago, Ill., a corporation of Delaware Application December 13, 1940, Serial No. 370,056

14 Claims. (Cl. 200—5)

This invention relates to improvements in switches, and is particularly concerned with a switch structure which by slight modification lends itself to control of at least two different kinds of circuits.

The invention has found valuable application in controlling a reversible fan motor for a hot water automobile heater, but is applicable for controlling any kind of a suitable circuit other than a motor circuit. Although not shown in the drawings, it may be said that automobile heaters are ordinarily mounted on the dash of the automobile. The heater control switch is preferably mounted on the lower edge of the instrument panel by drilling holes and using suitable fastening devices. The switch of this invention is particularly well adapted for the control of fan motors for automobile heaters.

Objects of the invention are to provide a simple, cheap switch structure which is easily assembled, and to provide a plurality of circuits which are operable by the same switch structure by slight modification or slight rearrangement of the contacts, but in which the structure remains essentially the same for both uses.

A feature of this invention is the mounting of the switch and contact elements on a base which can be inserted in a finishing and attaching casing in such manner that the buttons project at the front side of the casing, and so that the other parts are entirely hidden when the casing is attached to the dash, preferably the bottom of the dash. Another feature is that when the finishing casing is attached to the dash the various binding posts project and are accessible, that is, all the parts except the translucent buttons are invisible when the device is attached in the manner aforesaid, yet the binding posts lie outside of the finishing casing in an accessible position.

Another feature is that the assembly can be easily removed from the finishing casing by unscrewing only two screws which are accessibly positioned at the extreme ends of the finishing casing.

Another feature of the invention is that all of the parts of the switch, including the finishing casing, lend themselves either to molding or stamping operations, the only exceptions being the binding post and casing attaching screws. It is also a feature of the invention that by a simple addition of a part or two and slight modification or omission of a contact or two, the device may be used either for controlling a reversing motor at high and low speeds in either direction, or it can be used for controlling a non-reversible motor to obtain high, medium and low speed operation.

Another feature is that when the finishing casing is attached to the lower face of a dash by two screws only, the switching mechanism can be removed while the casing remains attached by merely unscrewing two screws and then moving the entire switching mechanism horizontally to disengage the translucent or transparent buttons from the opening in the finishing casing.

Another feature of the invention is the provision of what is referred to herein as an illuminated switch, the illumination being furnished by a small electric lamp which is carried by the base and lies within the finishing casing, and the use of translucent buttons through which the light shines whenever the motor is operating.

Another feature is the use of a swinging latch bar, as distinguished from a reciprocable latch bar, for holding the switches closed, thus obtaining a relatively compact structure of a minimum length. In devices using a reciprocable latch bar, reciprocation has to be allowed for in such manner that the overall length of the device in direction of reciprocation is increased proportionately to the distance of the spacing between the buttons and their contacts. By the practice of this invention no additional length has to be provided to allow for reciprocation. Another feature is the motion of the latch bar in a direction transverse, both to the direction of the row of buttons and to the direction of reciprocation of the buttons, and an additional feature is that the axis of swing of the latch bar substantially passes through a line which also intersects all members of the row switches.

Other features relate to the formation of a loop or a slotted contact member angularly related and attached to the base by a resilient plate which has a lamp socket, and to the use of contacts which traverse a loop or slot to be reciprocable therein with one end of the loop acting as a stop.

Features, objects and advantages of the invention will appear in the description of the drawings, and in said drawings—

Figure 1 is a plan section taken approximately on line 1—1 of Figure 5;

Figure 2 is a vertical section taken approximately on line 2—2 of Figure 1;

Figure 3 is a horizontal section taken approximately on line 3—3 of Figure 2 looking upwardly;

Figure 4 is a rear elevation of Figure 1;

Figure 8 is a rear view of the switch slightly modified for controlling a circuit like that shown in Figure 10;

For the sake of clarity and simplification, the description of the parts of the electrical circuit, including the contacts of the switch, will first be described and then the mechanical details of the switch will be described. Both the electrical circuits and the mechanical details are claimed herein.

Figure 9:
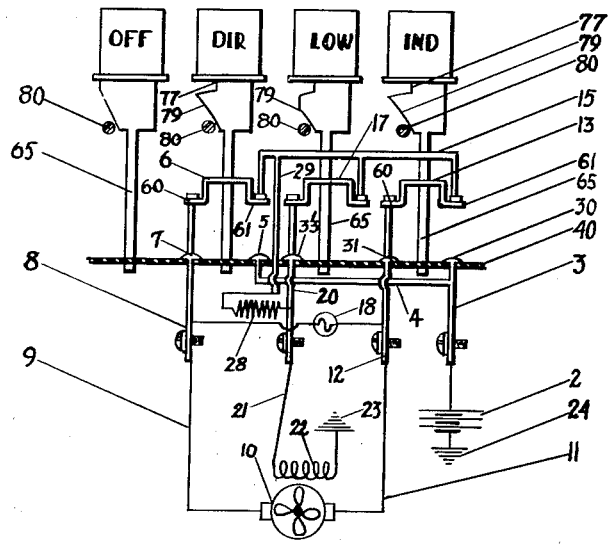
Figure 9 is a diagrammatic view showing one of the circuits controlled by the switch.

First referring to Figure 9 which is a diagram of a circuit found valuable for controlling a fan motor as part of a heating system of an automobile. A type of motor usable with the switch and system herein is a series wound direct low voltage motor which is operated either forward or in reverse direction. It will be understood that when a motor is mentioned it is intended to include all devices operable by a switch which is the mechanical and/or electrical equivalent of the one herein described, and also any motor which operates a fan for blowing heat through a heater for heating an automobile.

An automobile heater is often attached to the dash of the vehicle and the switch for operating its fan motor is attached to the instrument board. The switching mechanism claimed herein is adapted to be attached to an instrument board, and the circuit of Figure 9 is adapted to operate a heater motor so that its fan can be driven in forward or reverse direction and at high or low speed in each direction.

For convenience in description and as exemplifying one application of the invention the buttons have been marked respectively "Off", "Dir", "Low" and "Ind", meaning respectively off, forward, high speed, low speed and reverse high speed. When the off button is pressed after any one of the switches has been moved to closed position, that switch is released to move to open position. In this embodiment either the direct or indirect switch can be closed and held in that position while the low switch is closed. If direct and low are closed, closure of the indirect switch will cause them to open. This is a feature of the mechanical and electrical structure. If indirect and low are closed they will open when the direct switch is closed. The low switch can be closed before either the direct or indirect switch is closed, and will remain closed if one only of the others is subsequently closed.

Let it be assumed that the direct button is moved to close its switch. The circuit will then be as follows: from the battery or other suitable source 2, through battery post 3, rear bar 4, to contact 5, through movable contact 6 of the direct switch (now closed) to contact 7, to post 8, connection 9, to the brush of fan motor 10, by connection 11 from the opposite brush of the motor to post 12, through movable contact 13 of the open indirect switch, thence by front bar 15, through movable contact 17 of open low switch, to post 20, thence by connection 21 to motor field coil 22, thence to ground 23, thence to ground 24, thence to battery 2. A lamp 18 is connected in parallel with the motor and is energized whenever the motor is energized. The light from the lamp passes through buttons of plastic, transparent or translucent material so that the user may know when a switch has been moved from an initial position to another limit position.

Now let it be assumed that while the direct switch remains closed it is desired to reduce the speed of the motor. To do this the low button is moved from its initial to its opposite position and is locked in that position while the direct switch also remains locked in its closed position. This movement of the low switch prevents passage of current from the front bar 15 through movable contact 17 and forces the current to pass through a resistor 28 which is in series with the motor field coil 22. The circuit is now as follows: battery 2, post 3, rear bar 4, contact 5, movable contact 6, contact 7, post 8, connection 9, motor 10, connection 11, post 12, movable contact 13 of the indirect switch, to the front bar 15. Since the low switch has broken its connection with the front bar 15, the current follows the bar to an extension or post 29 of the bar. This post 29 is connected with resistor 28. The opposite end of the resistor is connected with the post 20. From post 20 the current passes through connection 21 to the motor field coil 22 to ground 23, thence to ground 24, thence to battery 2. It will be noted that before the low switch was moved from its initial position and its contact with the front bar 15 broken, the current traveled through 17 and 20 without passing through 29 and the resistor 28.

Now suppose all of the switches to be in their initial positions and then we move the indirect switch from its initial position to its opposite limit position. When this is done the motor will be reversed. The circuit will be: battery 2, post 3, contact 30, movable contact 13, to contact 31, post 12 of direct switch, connection 11, motor 10, connection 9, post 8, contact 6, front bar 15, movable contact 17, post 20, connection 21 to motor field coil 22, ground 23, ground 24, to battery 2. If now while the indirect switch remains in the position above mentioned the low switch be moved from its initial to its opposite limit position, part of the circuit remains the same but the resistor 28 is now put into circuit to reduce motor speed. The slowing circuit is as follows: battery 2, post 3, contact 30, movable contact 13, contact 31, post 12, connection 11, motor 10, connection 9, post 8, movable contact 6 of the direct switch, from bar 15, post 29 (connecting with bar 15), resistor 28, post 20, connection 21, motor field coil 22, to ground 23, ground 24, to battery 2. It is noted that in this case the low switch was moved to a position whereat its contact with bar 15 was broken and therefore the current was forced through 29 and the resistor 28 instead of passing through 17 and post 20.

It is to be understood that one of the features of this invention is that the mechanical structure of the switch permits of controlling circuits of two different kinds, with but very slight mechanical modification of the contacts. This is a valuable feature.

Figure 10:
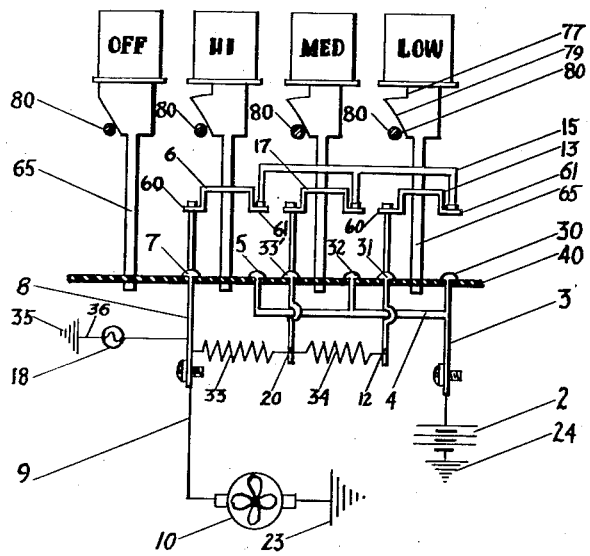
Figure 10 is a diagrammatic view of another circuit controlled by the switch and with very slight modification of certain of its contacts.

In the circuit of Figure 10 there is no motor reversing action. The fan of the motor is always driven in the same direction at high, or medium or low speed. Both rear and front bars are here used, but the front bar 15 does not have the connection 29, that is, does not have the post connection 29.

Let it be supposed that the high switch is moved to its opposite limit position. The circuit is then from battery 2, post 3, rear bar 4, contact 5, contact 6, contact 7, post 8, connection 9, motor 10, ground 23, ground 24, to battery 2. Now suppose that the medium switch be depressed. When this occurs the mechanics of the switch are such that the high button will be first released to assume its original position in the figure before the low switch is closed. The current will now be: battery 2, post 3, rear bar 4, contact 32, contact 17, contact 33', post 20, resistor 33 (which has less resistance than resistor 34), post 8, connection 9, motor 10, ground 23, ground 24 to battery 2.

Now suppose low to be moved to closed position. Medium will be released and the current will now be as follows: battery 2, post 3, contact 30, contact 13, contact 31, post 12, high resistor 34, post 20, contact 17, front bar 15, contact 6, bar 8, connection 9, motor 10, ground 23, to ground 24 to battery 2. In this embodiment the light 18 is connected with post 8 and is grounded at 35 so that it will be lighted whenever the motor operates. In the mechanical structure of this switch a connection 36 has the form of a bar ending in an eye through which a screw passes to attach the bar to the metal of the instrument board or equivalent ground 35.

It will be noted that the front bar 15 is in electrical circuit only when the low switch is in. The current is thus forced through the high resistor 34, after which it takes the path of least resistance through 20, 17, front bar 15, contact 6 and post 8 to the motor. When the medium switch is depressed, contact with the bar 15 is broken and so the current passes through contacts 32, 17, 33 and the low resistor 33 to post 8, thence to the motor.

Now referring to the mechanics of a switch of the type shown in Figure 9. The base which is of insulating material is indicated at 40 (see Figures 1 and 4). This base provides proper insulation for the various contacts and binding posts, practically all of which pass through it. It also forms one of the guides for a part of each translatable switch control means. This base assumes a vertical position when the switch is attached to an instrument board and for convenience the description will assume that the switch is so attached, although no limitation of the invention is intended by such assumption.

Mounted on the rear face of base 40 is a conducting bar 4 which has heretofore been referred to as the rear bar. This bar is connected by two devices which traverse the base and project at the front as contacts 5 and 30, respectively, for the direct and indirect switches. This bar 4 has a rearwardly turned portion 3 which serves as a binding post to which one of the battery terminals is connected (see Figure 9).

Mounted on the front of the base is the bar 15, previously referred to as the front bar. This bar is secured to the base 40 by an extension 41 and fastening device 42. The bar is further secured by a fastening device 43 passing through an extension or post 29, which post passes through the base to a point rearwardly thereof. Resistor 28 has one end connected to this post 29 (see Figures 1, 4 and 9).

Arranged in a horizontal row and passing through the base and projecting at the front and the rear of the base are the posts 12 and 20, respectively associated with the indirect and low switches. The post generally indicated by the numeral 8 is part of a one-piece structure associated with the direct switch, which structure includes (see Figure 3) a post which extends rearwardly as well as forwardly of the base 40, and which has a binding screw 45. The post 8 is of one piece with a plate 46 lying at the front of the base. This plate has an opening 47 therein to receive the electric lamp 18. The part 46 is suitably secured by a rivet to the base so that it can be sprung away from the base. The light has diametrically related pins 49, which pins after passing through recesses 48 are, after rotation of the lamp, brought into locking relation with diametrically related recesses 50 which are alined at a right angle to the recesses 48. When the lamp is secured, as shown in Figures 3 and 4, its rear contact engages a resilient contact element 52 secured by a suitable rivet 53 to the base. This contact or conductor is also secured as shown in Figure 4 by a rivet 56 to a lateral extension of post 12. This rivet passes through the base 40 and forms the contact 31 of post 12, which contact is engageable by part of the movable contact 13 of the indirect switch when that switch is moved from its initial to its opposite limit position.

The plate 46 has a horizontal loop-like extension herein designated 8, since it is considered to be an extension of that part. This loop is alined with corresponding loop-like extensions of posts 20 and 12. Traversing the loops are the corresponding extensions 60 of the movable contacts 6, 13 and 17. These extensions engage the outer ends of the loops as stops for limiting the outward motion of the switches at their initial positions shown in Figure 3. It will be seen that post 8, plate 46, lamp 18 and connection 52 are so arranged that the lamp circuit is in parallel across the motor circuit (see Figure 9). Contact 7 is really plate 46, which is part of post 8. Contact 33, which is engaged by 66 of the low switch, is part of a rivet which passes through an extension of post 29.

Figure 5:
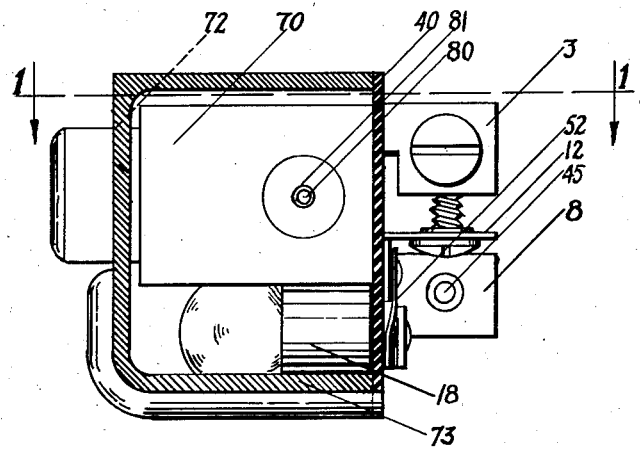
Figure 5 is a vertical section taken approximately on line 5—5 of Figure 1, with the outer casing shown applied.
Figure 6:
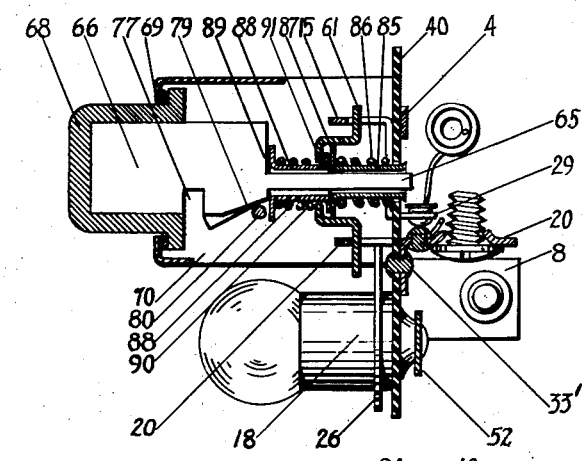
Figure 6 is a vertical section taken approximately on line 6—6 of Figure 1 through the low button, with the outer casing omitted.

Now referring to Figure 6, which is a section on line 6—6 of Figure 1 through the low switch. The front bar is shown at 15 in this figure and the rear bar is shown at 4. The post 29 is also here shown. The movable contact for the low switch is indicated at 17. The structures of all movable contacts are the same, each having the part 60 normally engaged with one of the loops, and a part 61 engaged with the bar 15. Each movable contact like 17 is associated with a slidable stem 65 of insulating material which has a flat portion 66 in part surrounded by a button 68, which translucent button is translatable in an opening 69 of a structure generally indicated at 70 which bridges the base 40 and lies in a horizontal plane and is suitably connected to the base (see Figure 1) as at 71. The buttons pass through openings 72 of an outer casing 73 of suitable composition material. This casing 73 is secured to the base 40 by screws 74. Casing 73 is secured to the instrument board by screws passing through openings 75.

The element 66 has a latching notch 77 and each of the other elements 66, with the exception of the off button, is provided with a similar notch, the notches being alined horizontally when the buttons are in the initial position shown. Latching means is provided which includes inclined portions 79 associated with the notches 77 (except for the off button), and these inclined planes lead forwardly and downwardly to intersect the notch 77. As shown in Figure 6 the inclined plane 79 of the low switch does not extend as far from the translative axis of stem 65 as do the inclined planes of the direct and indirect switches (also see Figure 9). The inclined plane of the off switch is the longest. These projections and notches are related as shown to a swinging bar 80. The arrangement is such that depression and locking of the low switch will not swing the bar sufficiently to cause it to move out of the notches of either the direct switch or the indirect switch.

The bar is pivoted as at 81, in the structure 70 and the pivotal axis, in this embodiment, intersects the axis of translation of the stems 65. The bar is yieldably held in the initial position shown, by a spring 82, and the bar is moved downwardly against the action of the spring.

Again referring to Figure 6. It will be seen that the buttons can be moved from an initial position to bring the notch 77 into engagement with the bar 80 to close the switches and lock the elements 66 in their switch control positions.

Each of the stems for the direct, low and indirect switches is slidable in the sleeve 85 and this sleeve is in turn slidable in an opening in the base 49. A spring 86 is interposed between the base and a shoulder 87 of the sleeve. Also surrounding each stem 65 is a second sleeve 88 at one end abutting a shoulder 89 of the part 66 and at the opposite end abutting the shoulder 87 of the sleeve 85. The movable switch element 17 is slidably traversed by the sleeve 88 and a spring 90 presses the contact 17 against a shoulder 91 of the sleeve 88. The shoulders of the sleeves are circular and appear as terminal flanges formed by pressing. No limitation for the broader invention is intended by this statement, but the specific structure is claimed because of its cheapness and ease of assembly of the parts.

The arrangement is thus such that when the element 66 is translated, both sleeves move, sleeve 85 against the action of the spring 86 until the parts 60 and 61 engage respective contacts on the base, after which the element 66 may continue to move against the action of the spring 90 to allow the bar 80 to enter the notch 77. During this movement the shoulder 91 moves away from the contact 17. Locking thus occurs after contact is made.

The arrangement herein allows two switches to be simultaneously moved to a control position to thereafter both be held by the bar, with the arrangement such that when a third switch is moved to the opposite control position, the first two switches are released to assume their initial positions. This is accomplished by varying the relations of the inclined planes to one another and to the notches 77 so that the fingers or projections as measured from the axis of translation of the sleeve or button outwardly toward the bar are varied. There is no intention to entirely limit the invention to the specific arrangement, although per se it is believed to be new. The use of inclined planes and notches in relation to a swinging bar is believed to be broadly new.

By using a swinging lock bar, the action is smoother and there is less friction than where a slide is used.

Although for convenience of description reference has been made to off, direct, low, indirect, high, medium, etc. in the description, it will be understood that the switching principles and structures herein disclosed are applicable in many fields.

Figure 7:
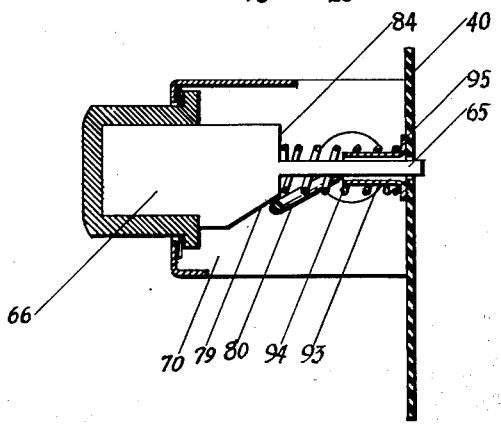
Figure 7 is a vertical section taken on line 7—7 of Figure 1 through the off button, the outer casing being omitted.

Referring to Figure 7, it will be noted that the inclined plane of the part 66 is longer than any of the others, and that the part 66 has no notch 77. Therefore, when the off button shown in this figure is pressed, it moves the bar to release any or all buttons which have previously been locked by entry of the bar into a notch 77. In the off button control the stem 65 traverses the base 49 and also traverses a sleeve 93. A spring 94 is interposed between the shoulder 84 of the part 66 and a flange 95 of the sleeve 93 to normally hold the off switch in the position shown. The outer end of the sleeve is contacted by shoulder 84 to limit inward motion of the off button. It can readily be seen that when the off switch is pressed, bar 80 is moved through a sufficiently large angle in a direction away from the axes of the stems 65 to any of the other switches.

We claim as our invention:

1. An electrical switch having a row of contact-carrying elements, translatable in the same direction to a control position, a latch bar swingable about a pivotal axis which is transverse to the direction of translation of the contact-carrying elements, each of said elements having a latching projection adapted to engage and swing the bar during motion of the element to control position, and to thereafter releasably hold the element in that position, each latch projection being adapted to swing the bar to a degree differing from that of any other, and so that two of said contact-carrying elements can be simultaneously locked in control positions and can be subsequently simultaneously automatically released when a third element is moved to a control position.

2. An electrical switch having a row of contact-carrying elements, translatable in the same direction to a control position, a latch bar swingable about a pivotal axis which is transverse to the direction of translation of the contact-carrying elements, each of said elements having a latching projection adapted to engage and swing the bar during motion of the element to control position, and to thereafter releasably hold the element in that position, each latch projection being adapted to swing the bar to a degree differing from that of any other, and so that after a first one of the elements has been moved to a control position it will remain latched in that position by the bar while a second element is moved to its control position and latched by the bar, and so that during motion of a third element to its control position, the first and second elements are released by the bar to move to an opposite control position.

3. An electrical switch having a plurality of contact-carrying elements, each translatable in the same direction to a control position, a latch bar swingable about a pivotal axis, each of said elements having a latching projection adapted to engage and swing the bar during motion of the element to control position, and adapted thereafter to releasably hold the element in that position, the latch projection of one of said elements being adapted to swing the bar to a greater degree than the projection of any other element, the projection of another of said elements being adapted to swing the bar to a lesser degree than that of the projection of any other element, and another of said elements having a projection adapted to swing the bar to a lesser degree than that of the projection of the first mentioned element and to a greater degree than that of the projection of the second mentioned element.

4. An electrical switch comprising a base, a sleeve translatable on the base, a contact-carrying member translatable on the sleeve, contacts alternately engageable by a contact carried by the member and acting as stops, a spring for moving the sleeve to one control position, a second spring yieldably holding the member against a shoulder on the sleeve, a button acting on the sleeve to move the same against the action of both springs to an opposite control position and having an extension slidably entering the sleeve, a swingable latch bar, and means for yieldably moving it to latching position, said button extension having a latching projection adapted to engage and swing the bar during motion of the sleeve to said opposite control position and thereafter releasably hold the button and contact-carrying member in said position, said latching occurring after the member has reached its control position, the sleeve being movable by the button independently of the member for this purpose, and a second button for moving the bar to release said projection to permit return of the sleeve and members to their first mentioned control positions.

5. A device of the class described comprising a base, a sleeve slidable in the base, a spring interposed between the base and the sleeve and normally yieldably holding a shoulder of the sleeve against the base as a stop, a second sleeve normally abutting the first sleeve, a contact slidable on the second sleeve, a spring yieldably holding the contact against a shoulder of the second sleeve, a button having a shoulder engaging the second sleeve and having an extension passing through both sleeves, and a contact with which the slidable contact is engageable when the button is moved to compress the springs.

6. A device of the class described comprising a base and a conductor bar arranged at one side of and spaced from the base, a binding post having an opening, a movable contact normally having its opposite ends respectively engaging the bar and one side of the opening as stops, a spring yieldably holding the contact against the bar and the opening of the post, means for moving said contact away from the bar and toward the base, and means allowing said contact-moving means to continue motion in the same direction independently of said contact after the latter has moved to its limit position.

7. A device of the class described comprising a base and a conductor bar arranged at one side of and spaced from the base, a binding post passing through the base and having an opening arranged at the same side of the base as the bar, a movable contact normally having its opposite ends respectively engaging the bar and one side of the opening as stops, a spring yieldably holding the contact against the bar and the opening of the post, and means for moving said contact away from the bar toward the base, said binding post having a conducting extension which is engageable by one end of said contact as a stop when the opposite end of said contact is engaged with a contact of the base, said extension providing a lamp socket, and a conductor at that side of the base opposite the bar with which a lamp in said socket is adapted to make electrical contact, said last mentioned conductor being connected through a second binding post and a second movable contact with said bar.

8. A device of the class described comprising, a base, a switch structure on the base, including spring means for moving the switch to one control position, a switch-operating element for the structure having a button having an extension guided by a part of the switch structure, in a manner to be withdrawn in a direction away from the base, and having a shoulder abutting a terminal part of the switch structure which is most remote from the base, an arched member having an opening translatably receiving the button, said button having a shoulder engaging the member to limit motion of the switch-operating element against the action of the switch spring means, said member being releasably secured to the base, and means arranged between the switch and the inner side of the arched member for latching the switch-operating elements against the action of the spring means including a bar movable by the switch-operating element and pivoted to said arched member.

9. A device of the class described comprising, a base, a row of switch structures on the base, including spring means for moving the switch to one control position, a switch-operating element for each switch structure, each operating element having a button having an extension guided by a part of the switch structure in a manner to be withdrawn in a direction away from the base, and having a shoulder abutting a terminal part of the switch structure which is most remote from the base, an arched member bridging the switches and having openings, each translatably receiving a button, each button having a shoulder engaging the member to limit motion of the switch-operating element against the action of the switch spring means, said member having legs releasably secured to the base, and means for latching the switch-operating elements against the action of the spring means, including a bar movable by each switch-operating element and pivoted to the legs of the arched member.

10. A device of the class described comprising, a base, a switch structure carried by the base and having a tubular member and a spring against the action of which spring the switch is moved toward the base, a switch-operating element having a button and an extension slidably guided in the tube in a manner to be easily withdrawn by motion away from the base, an arched member having an opening in which the button is guided, said button having a shoulder abutting the arched member to limit movement of the switch-operating member under the action of the spring, means detachably securing the arched member to the base, an arched bar swinging upon the arched member and disposed between the switch and the button, said switch-operating element having an inclined plane against which said arched bar is spring-urged, and said operating element having a notch into which the plane leads, the arrangement being such that when the switch-operating element is moved against the action of the switch spring its inclined plane moves the bar and the bar enters the notch to releasably hold the switch-operating element against the action of the switch spring.

11. A device of the class described comprising, a base, a first tube slidable in the base, a second tube aligned with and abutting the first tube, a contact slidable on the second tube and normally spaced from a companion contact on the base, a first spring for urging the first tube away from the base, a spring for urging the contact against a shoulder of the second tube, a button element having outer and inner oppositely faced shoulders, the inner shoulder abutting the second tube, a button retaining and guiding member having an opening receiving the button head, said member being engaged by the outer shoulder to limit motion of the button element under the action of the springs, a swinging latch bar and means on the button element disposed between said inner and outer shoulders with which the bar cooperates to releasably hold the button element after translation of said element against the action of the springs.

12. A device of the class described comprising, a base, a switch structure including two aligned tubes, one slidable in the base, a first contact carried by one of the tubes, spring means for controlling the tubes and contact for a switching operation in which the tubes are translated to move the first contact toward a second contact, a button element having an extension slidable in the tubes, a button retaining member having an opening traversed by the button and engaging a shoulder on the button element to limit motion of the button element under the action of the springs, a swinging latch bar and means on the button element disposed between the shoulder and one of the tubes with which the bar cooperates to releasably hold the button element after translation of said element against the action of the springs, and means detachably securing said member to the base, whereby after release of the member and its removal from the button said button can be simply pulled out of said tubes.

13. A device of the class described comprising, a base, a switch structure including two aligned tubes, one slidable in the base, a first contact carried by one of the tubes, spring means for controlling the tubes and contact for a switching operation in which the tubes are translated to move the first contact toward a second contact button element having an extension slidable in the tubes and a guiding member having an opening traversed by the button and engaging a shoulder on the button element to limit motion of the button element under the action of the springs, and means releasably attaching said member to said base.

14. A device of the class described comprising, a base having an opening therein, a first sleeve slidable in the opening and means for limiting its sliding motion, a first spring surrounding the sleeve and adapted to yieldably move it away from the base, a second sleeve abutting the first sleeve and having a shoulder, a contact slidable on the second sleeve and abutting shoulder and adapted to engage a contact on the base, a second spring for yieldably holding the contact against the shoulder, a push button having an extension slidable in both sleeves, and having a shoulder for moving the second sleeve against the action of its spring, said button having a portion inclining inwardly toward the end of the second sleeve and toward the axis of translation of the button, and having a notch into which the high point of the inclined portion leads, a swingable latch bar, and means yieldably urging it against said inclined portion, said bar being adapted to enter said notch and hold the springs under compression and to swing away from said axis as the springs are compressed.

HENRY W. FAULSTICH.
WALTER C. LUENEBURG.